(12) United States Patent  (10) Patent No.: US 6,601,152 B1
Uchida  (45) Date of Patent: Jul. 29, 2003

(54) STORAGE APPARATUS, AN ACCESS CONTROL APPARATUS FOR A RECORDING MEDIUM AND AN ACCESS CONTROL METHOD FOR A RECORDING MEDIUM (75) Inventor: Yoshiaki Uchida, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/497,444

(22) Filed: Feb. 3, 2000

(30) Foreign Application Priority Data

Jul. 9, 1999 (JP) .......................................... 11-196771

(51) Int. Cl.⁷ .............................................. G06F 12/14
(52) U.S. Cl. ........................ 711/164; 711/166; 713/202
(58) Field of Search .......................... 713/1, 100, 200, 713/202; 711/111, 112, 163, 164, 166, 173

(56) References Cited

U.S. PATENT DOCUMENTS

| 5,375,243 | A | * | 12/1994 | Parzych et al. | ............. 713/202 |
| 5,644,444 | A | | 7/1997 | Braithwaite et al. | .......... 360/60 |
| 5,809,545 | A | * | 9/1998 | Ozaki et al. | ................ 711/164 |
| 5,966,732 | A | * | 10/1999 | Assaf | .......................... 711/170 |
| 6,286,087 | B1 | * | 9/2001 | Ito et al. | ...................... 711/164 |
| 6,330,210 | B1 | * | 12/2001 | Weirauch et al. | ............. 369/32 |

FOREIGN PATENT DOCUMENTS

| JP | 57150117 | 9/1982 |
| JP | 60189531 | 9/1985 |
| JP | 63175955 | 7/1988 |
| JP | 1309120 | 12/1989 |
| JP | 11213551 | 8/1999 |

* cited by examiner

Primary Examiner—Gary J Portka
(74) Attorney, Agent, or Firm—Greer, Burns & Crain, Ltd.

(57) ABSTRACT

In a storage apparatus, a recording medium has a first recording region and a second recording region. A command executor sets a first and second password in the first and second recording region respectively for performing access control so as to restrict unauthorized access to the recording medium by a third party. An access controller performs the access control on the basis of the first password and the second password. When initializing the recording medium, only the first recording region can be initialized. It is possible to effectively perform the access control on the recording medium all the time by an authorized user and to maintain the security.

7 Claims, 9 Drawing Sheets

STORAGE APPARATUS, AN ACCESS CONTROL APPARATUS FOR A RECORDING MEDIUM AND AN ACCESS CONTROL METHOD FOR A RECORDING MEDIUM

FIELD OF THE INVENTION

The present invention relates to a storage apparatus, an access control apparatus for a recording medium and an access control method for a recording medium, in which there is provided a function of preventing any unauthorized access to a recording medium by a third party by the use of a password or the like. More particularly, the present invention relates to a technology in which effective access control can be performed on the recording medium so as to maintain the security even if an authorized user forgets the password or the like.

BACKGROUND OF THE INVENTION

In recent years, storage apparatuses including various types of recording media are being developed. In particular, with the spread of personal computers, the storage apparatuses generally use removable media, such as magneto-optical disks, floppy disks, and optical disks as the recording media. Although the recording media of this type have the advantage of easy handling because of their small size and light weight, they have also the disadvantages that they can easily be taken away by a third party and the data can easily be stolen or altered.

Therefore, passwords or the like have been conventionally used to prevent stealing and alteration of the data.

In a conventional storage apparatus, in order to improve the security by preventing unauthorized access (reading/writing and deletion) by a third party, a password is set in advance in a recording medium and an internal memory of the device. When a user inputs a password (the user may be an authorized person or a third party), it is compared with the already recorded password, and access to the recording medium is permitted only when the two passwords match. The storage apparatus mentioned here is described in detail in Japanese Patent Application Laid-Open Nos. SHO 57-150117, SHO 60-189531, SHO 63-175955, and HEI 01-309120.

Moreover, in a storage apparatus in which a removable medium such as a magneto-optical disk or a floppy disk is used as a recording medium, the recording medium is initialized before use. This initialization causes erasure of the password and of course the secret code number and the data recorded in the recording medium. In the storage apparatus of this kind, the password is used for the purpose of prevention of unauthorized access without imposing any limitation of initialization. Therefore, if the user forgets the password, he/she user must set a new password after the initialization of the recording medium. If the initialization of the recording medium can not be carried out because the user has forgotten the password, the treatment of the complete prohibition of the initialization of recording medium etc. is taken.

The description has been given above of the example of the access control and initialization control on the recording medium by using the password in the conventional storage apparatus. However, in the conventional storage apparatus, an inconvenient situation occurs for the authorized user as explained below. That is, when a password is used for the purpose of the access control in such a manner that only the authorized user can access the recording medium, and if the authorized user forgets the password, he/she cannot virtually access the recording medium.

Consequently, in such a case anybody can initialize the recording medium because a password is not required for initialization and then set a new password. However, the recording medium can be disadvantageously initialized by a third party other than the authorized user because a password is not required for initialization. In view of this, in the conventional recording medium, there have been no measures except resetting a new password after the initialization in the case where the user forgets the password for the access control. Therefore, there have arisen problems that the convenience for the authorized user is deteriorated, and further, that the security is degraded since a third party can initialize the recording medium.

SUMMARY OF THE INVENTION

The present invention has been made in light of the problems described above. It is an object of the present invention to provide a storage apparatus, an access control apparatus for a recording medium and an access control method for a recording medium in which effective access control can be performed on the recording medium all the time by an authorized user and the security can be maintained.

According to one aspect of this invention, in a storage apparatus, an access control unit normally performs the access control on the basis of a first control information and a second control information recorded respectively in a first recording region and a second recording region of the recording medium. The first control information and the second control information is the information which is used to prevent an illegal access by a third party. When the recording medium is required to be initialized, the first recording region can be initialized using an initializing unit but the second recording region cannot be initialized. Thus, the first control information can be erased but the second control information can not be erased and always remains, so that the access control can be performed even in the case of the initialization on the basis of the second control information. Passwords or flags (data), for example, may be used as the first control information and the second control information.

As explained above, the first control information and the second control information are set in the first recording region and the second recording region respectively, and the second recording region cannot be initialized at the time of initialization. Thus, the effective access control can be performed thereafter on the basis of the second control information, and further, the security can be maintained.

Further, the initialization unit controls the initialization of the first recording region on the basis of initialization control information such as a password recorded in the second recording region. Since the second recording region cannot be initialized, the initialization control information cannot be erased. Since the initialization control information is set in the second recording region which cannot be initialized, it is unnecessary to reset the initialization control information at the time of next initialization.

Further, since the access control is performed on the basis of any one of the first control information and the second control information, it is possible to perform the effective access control thereafter on the basis of the remaining second control information. Further, it is possible to maintain the security even when the first control information is erased by the initialization.

Further, since the access control is performed on the basis of both of the first control information and the second control information, it is possible to enhance the security. Further, it is possible to prevent any unauthorized access by a third party on the basis of the remaining second control information even in the case of the initialization.

According to another aspect of this invention, in an access control method for a recording medium having a first recording region and a second recording region, first control information and second control information are set in the first recording region and the second recording region of the recording medium respectively, and the second recording region cannot be initialized at the time of initialization. Thus, the effective access control can be performed thereafter on the basis of the second control information, and further, the security can be maintained.

Other objects and features of this invention will become apparent from the following description with reference to the accompanying drawings.

DESCRIPTION OF THE PREFERRED EMBODIMENTS

A storage apparatus, an access control apparatus for a recording medium and an access control method for a recording medium in an embodiment according to the present invention will be explained in details in reference to the drawings below.

Figure 1:
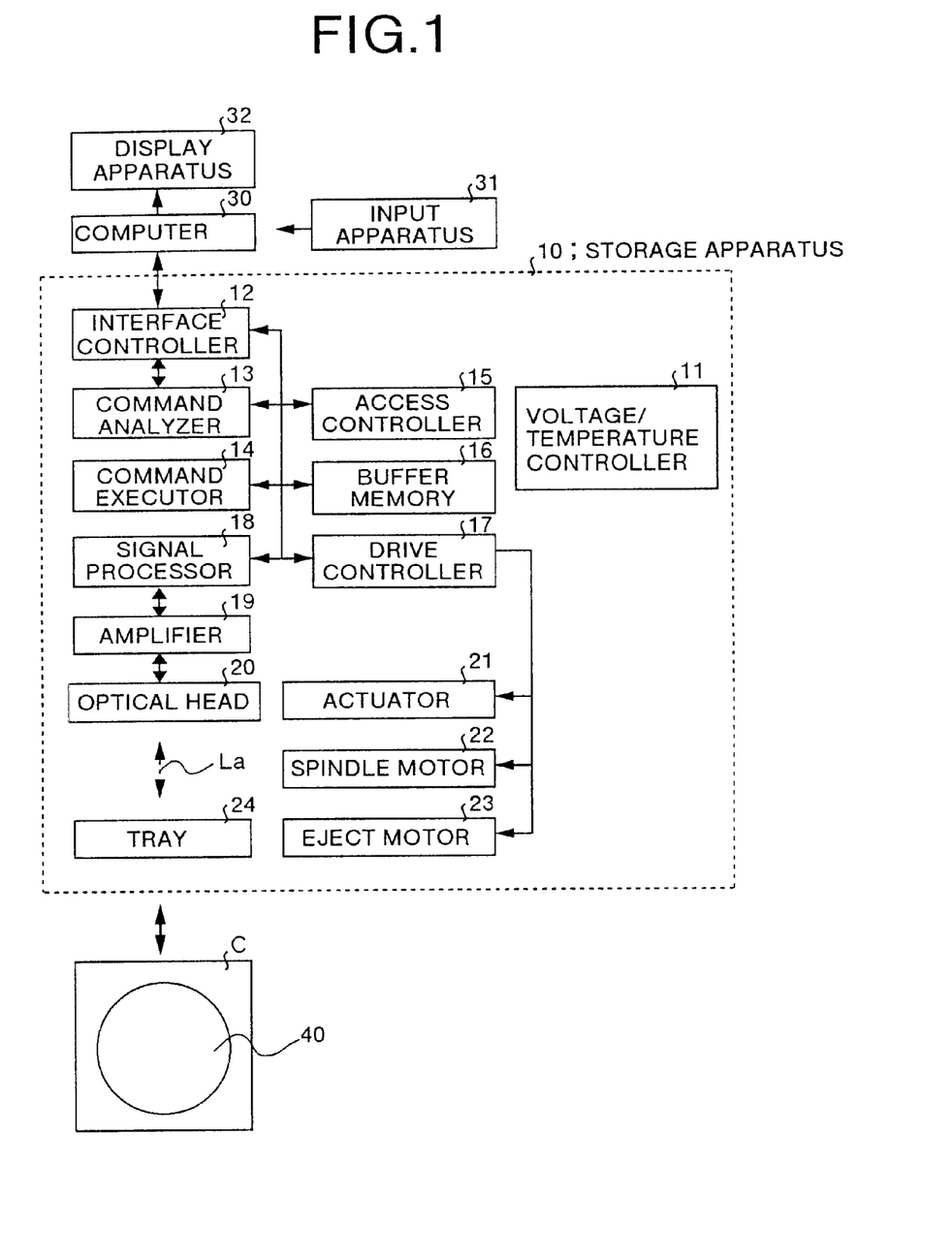
FIG. 1 is a block diagram showing the configuration of an embodiment according to the present invention.

FIG. 1 is a block diagram showing the configuration of an embodiment according to the present invention. In FIG. 1, a storage apparatus 10 writes/reads data in/out of a recording medium 40 as a removable medium based on a command from a computer 30. The computer 30 is connected to the storage apparatus 10 via a not shown small computer system interface (SCSI) cable. The computer 30 sends a command to the storage apparatus 10, instructing to write/read the data in/out of the recording medium 40, the data, a password or the like. The recording medium 40 is a magneto-optical (MO) disk capable of optically writing/reading the data, and is contained inside a case C made of a resin.

The password is used to check whether or not a user, who writes/reads the data in/out of the recording medium 40, is an authorized person. In other words, the password is used for access control of restricting unauthorized writing/reading by a third party. An input device 31 includes a keyboard, a mouse and the like, and is used to input the password in addition to various input. A display device 32 is a cathode-ray tube (CRT), a liquid crystal display (LCD) or the like, for displaying data to be written in the recording medium 40 or data read out of the recording medium 40.

In the storage apparatus 10, a voltage/temperature controller 11 controls a power source voltage and a temperature inside the device. An interface controller 12 controls communications with the computer 30. The interface controller 12 receives a command, data, a password and the like from the computer 30, and then, temporarily stores them in a buffer memory 16.

The buffer memory 16 is a dynamic random access memory (DRAM), for temporarily storing data to be written in the recording medium 40 or data read out of the recording medium 40 as well as the command and the password. Furthermore, the interface controller 12 sends the read data to the computer 30. A command analyzer 13 analyzes the command stored in the buffer memory 16, to confirm the type of the command (e.g., a write command, a read command, a seek command or the like).

A command executor 14 executes writing or reading processing in accordance with the command based on the analysis result of the command analyzer 13. An access controller 15 monitors the analysis result of the command analyzer 13 and the command executing condition of the command executor 14, so as to perform access control to the recording medium 40. The details of the access control will be explained later. A drive controller 17 supplies a drive voltage to each of an actuator 21, a spindle motor 22 and an eject motor 23 and also performs servo control. A signal processor 18 performs processing of modulating data to be written in the recording medium 40 or of demodulating a signal read from an optical head 20. An amplifier 19 amplifies the signal read by the optical head 20.

The optical head 20 is disposed in the proximity of a recording surface of the recording medium 40. The optical head 20 is a read/write head which has the function to write data in the recording medium 40 and to read data out of the recording medium 40 by irradiating the recording surface of the recording medium 40 with a laser beam La. The optical head 20 comprises a semiconductor laser for generating the laser beam La, an objective lens for reducing a diameter of the laser beam La radiated on the recording surface of the recording medium 40, an optical component (collimate lens, a beam splitter or the like) for introducing the laser beam La generated by the semiconductor laser to the objective lens, and a photosensing element for sensing the light reflected on the recording medium 40 and converting the light into an electric signal.

The actuator 21 is provided with a drive coil so as to move the objective lens of the optical head 20 toward the radial and focusing directions of the recording medium 40. Here, the vertical direction to recording surface of recording medium is called the direction of foci. A tray 24 stores the recording medium 40 at the time of writing/reading, and can be moved. The eject motor 23 drives the tray 24 at the time of ejection of the recording medium 40. The spindle motor 22 rotationally drives the recording medium 40 stored in the tray 24 at the time of writing/reading.

Figure 2A:
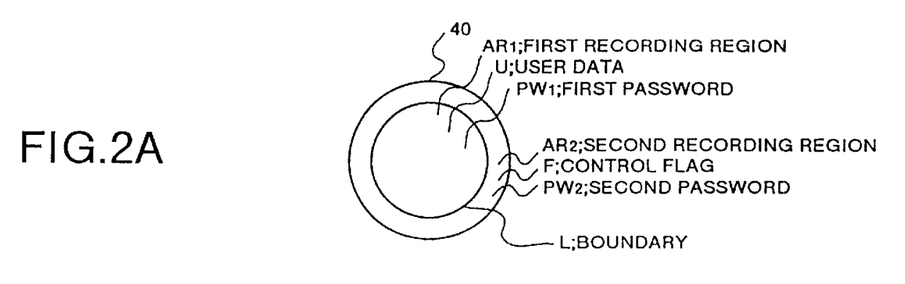
FIG. 2A to FIG. 2C show the data structure of a recording medium 40 shown in FIG. 1.
Figure 2B:
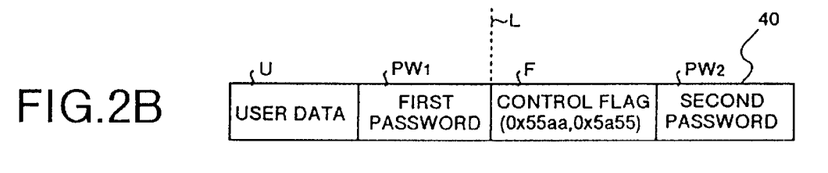

A description will be given of the data structure of the recording medium 40 shown in FIG. 1 in reference to FIGS. 2A to 2C. As shown in FIGS. 2A and 2B, with a boundary L drawn along an outer peripheral edge, the recording medium 40 includes a first recording region $AR_1$ near the center inside of the boundary L and a second recording region $AR_2$ outside of the boundary L. The first recording region $AR_1$ is a region which is permitted to be initialized. User data U, a first password $PW_1$ and the like are recorded in the first recording region $AR_1$.

The user data U is data to be recorded in a recording region within the range from 23.72 mm to 41.00 mm in radius on the recording medium 40 based on the international organization for standardization (ISO) of a magneto-optical disk of 3.5 inch. The second recording region $AR_2$ is a region which is prohibited to be initialized after the factory shipment of the recording medium 40.

In the second recording region $AR_2$, a control flag F, a second password $PW_2$ and the like are recorded. The first and second passwords $PW_1$ and $PW_2$ are used in access control for restricting writing/reading in the recording medium 40. The details of the access control by the use of first and second passwords $PW_1$ and $PW_2$ will be explained later.

The control flag F is stored at a head address of the second recording region $AR_2$. The control flag F is a flag for use in initialization control, and is, for example, a value "0x55aa" or "0x5a55". The control flag F is set by a manufacturer of the recording medium 40. Consequently, a user cannot set the control flag F.

The value "0x55aa" represents an initialization prohibiting flag for prohibiting the initialization of each of the first and second recording regions $AR_1$ and $AR_2$. That is, in the case where the value "0x55aa" is set as the control flag F, the recording medium 40 cannot be initialized. The value "0x5a55" represents an initialization prohibiting flag for prohibiting the initialization of the second recording region $AR_2$ out of the first and second recording regions $AR_1$ and $AR_2$. That is, in the case where the value "0x5a55" is set as the control flag F, the first recording region $AR_1$ can be initialized while the second region $AR_2$ cannot be initialized. In the case where none of the values are set in the control flag F, both of the first and second recording regions $AR_1$ and $AR_2$ can be initialized.

Figure 2C:
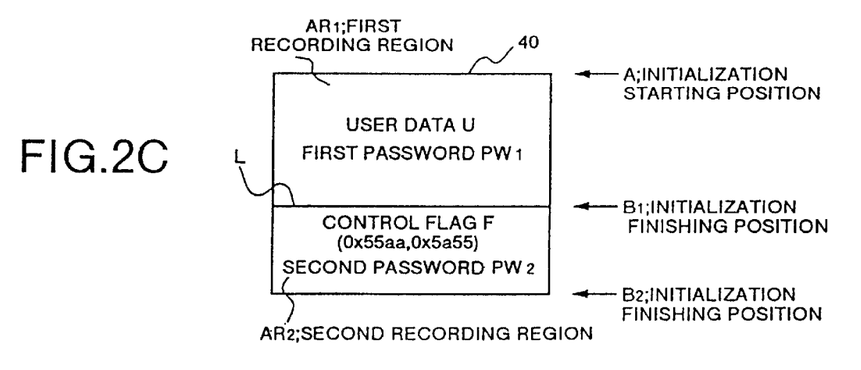

FIG. 2C is a schematic view showing the data structure of the recording medium 40 illustrated in FIG. 2A. In FIG. 2C, the same numerals are assigned to the elements corresponding to those in FIG. 2A. An initialization starting position A illustrated in FIG. 2C corresponds to an initialization starting cylinder of the recording medium 40 at the time of the starting of the initialization. In other words, the initialization starting position A corresponds to the position of the optical head 20 (lens) at the time of the starting of the initialization. An initialization finishing position $B_1$ corresponds to the boundary L shown in FIG. 2A, and is a finishing position when only the first recording region $AR_1$ is initialized. An initialization finishing position $B_2$ is a finishing position when both of the first and second recording regions $AR_1$ and $AR_2$ are initialized.

Operation Example 1

An operation Example 1 in the embodiment will be explained below in reference to FIGS. 3 to 5. This example explains the operation of initializing the recording medium 40 in a manufacturing factory before shipment and the operation of initializing the recording medium 40 by a user after shipment from the manufacturing factory. To begin with, operation of the initialization before shipment is explained. A worker in the factory inputs an initialization command (hereinafter referred to as "an initialization command for a manufacturer") via the input device 31 shown in FIG. 1. Only this worker (or his boss) knows the initialization command for the manufacturer to be input. The computer 30 sends this initialization command for the manufacturer to the storage apparatus 10 via the SCSI cable. Consequently, the initialization command for the manufacturer is received by the interface controller 12, and then, is stored in the buffer memory 16.

As a result, the command analyzer 13 analyzes the initialization command for the manufacturer, and then, sends the analysis result to the command executor 14. At this time, the access controller 15 determines in step SA1 of FIG. 3 whether the recording medium 40 is a product before shipment based on the analysis result of the command analyzer 13. Specifically, the access controller 15 determines this based on whether or not the input initialization command is the initialization command for the manufacturer. In this case, the access controller 15 determines that recording medium 40 is a product before shipment. In step SA3 the access controller 15 sets the initialization finishing position "$B_2$" shown in FIG. 2C in the command executor 14.

Figure 4:
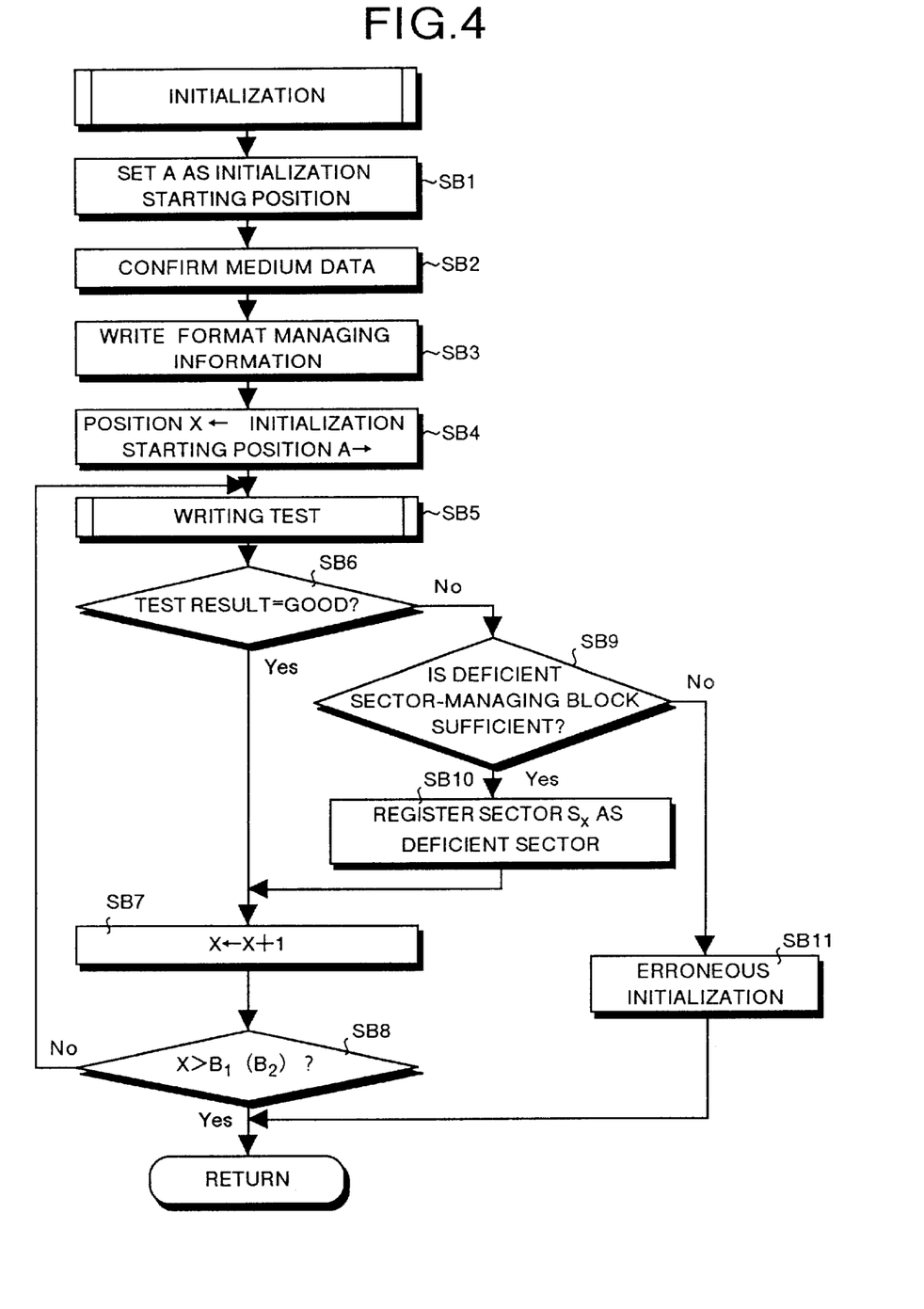
FIG. 4 is a flowchart showing initialization in the embodiment according to the invention.

The command executor 14 then executes in step SA4 the initialization (see FIG. 4). That is, the command executor 14 sets the initialization starting position to "A" (see FIG. 2C) in step SB1 shown in FIG. 4. The command executor 14 then controls the optical head 20 in step SA2 so as to confirm medium data (type, capacity and the like of the medium) read out of the recording medium 40. The command executor 14 then controls the optical head 20 in step SA3 so as to write format managing information according to the medium data in the recording medium 40. The format managing information is the information for managing information associated with the initialization (such as division information).

The command executor 14 in step SA4 then substitutes the initialization starting position A (see FIG. 2C) into a position X. By this, the drive controller 17 controls the drive of the actuator 21, so as to move the optical head 20 to the position X (=the initialization starting position A: see FIG. 2C). The command executor 14 in step SA5 executes a writing test shown in FIG. 5.

Figure 5:
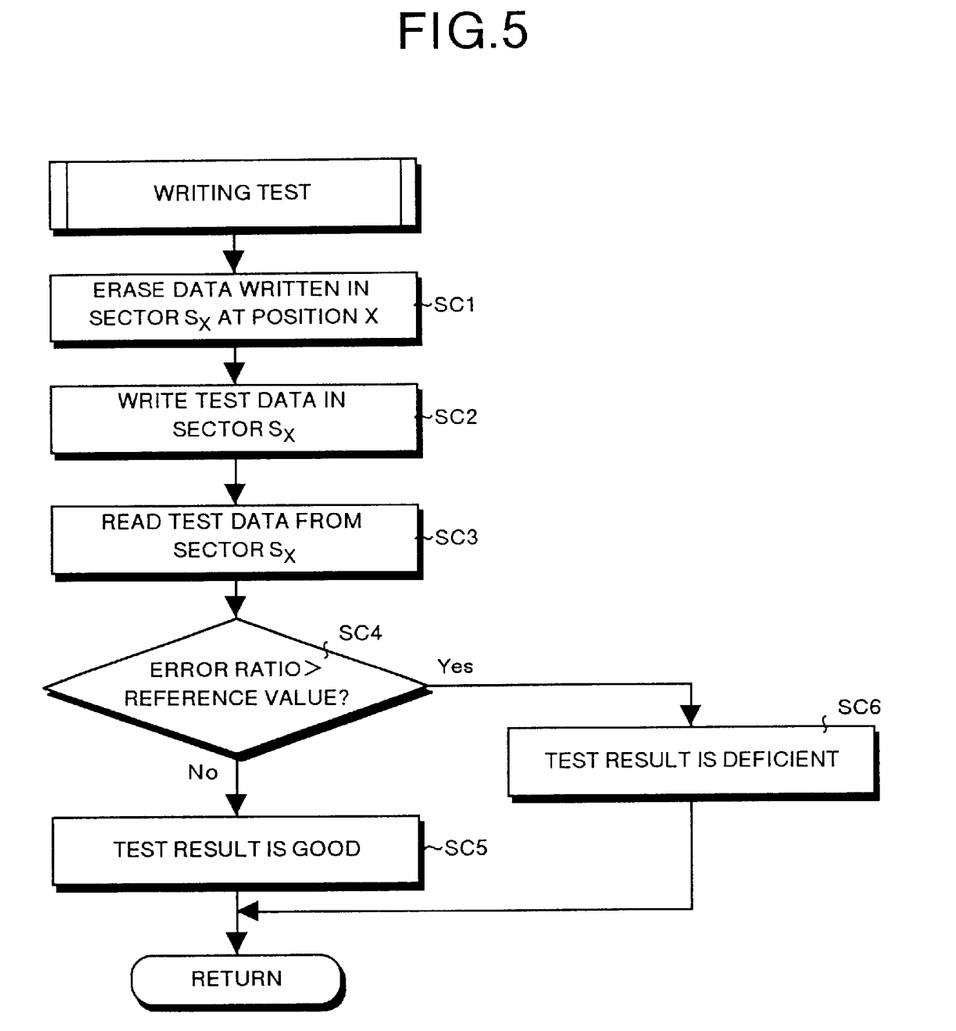
FIG. 5 is a flowchart showing a writing test in the embodiment according to the invention.

In the writing test, the command executor 14 erases the data written in a sector $S_x$ at the position X (i.e., the initialization starting position A) (Step SC1 of FIG. 5). The command executor 14 the next step SC2 writes test data in the sector $S_x$. This test data is data for examining an error generating ratio (hereinafter referred to as "an error ratio") at the time of writing/reading at the sector $S_x$.

The command executor 14 in step SC3 reads the test data from the sector $S_x$. The command executor 14 then obtains the error ratio by comparing test data (original data) before being written in the sector $S_x$ with read test data.

The command executor 14 then determines in step SC4 whether or not the error ratio exceeds a predetermined reference value. In other words, it is determined in step SC4 whether or not the sector $S_x$ is a deficient sector. If the error ratio does not exceed a predetermined reference value, the test result relating to the sector $S_x$ is assumed to be good (Step SC5). If the error ratio exceeds a predetermined reference value, the test result is assumed to be deficient (Step SC6).

The command executor 14 then determines in step SB6 of FIG. 4 whether or not the test result in the writing test of step SB5 is good. If the test result is good, the command executor 14 increments the position X (i.e., the initialization starting position A) by 1 into "A+1" (Step SB7). If the test result is deficient, the command executor 14 determines whether or not a not shown deficient sector-managing block in the recording medium 40 is sufficient (Step SB9). This deficient sector-managing block is a region in which information (positional information) relating to a deficient sector is recorded.

If the deficient sector-managing block is sufficient, the sector $S_1$ is determined as a deficient sector so that information relating to the sector $S_x$ is registered in the deficient sector-managing block (Step SB10). The command executor 14 then increments the position X by 1 into "A+1" (Step SB7). If the deficient sector-managing block is not sufficient, the command executor 14 determines the failure in the initialization (Step SB11). The process then returns to the main process shown in FIG. 3, and the initialization process is ended.

As described above, in step SB7 the command executor 14 increments the position X to "A+1". In step SB8, the command executor 14 determines whether or not the position X (in this case, "A+1") passes beyond the initialization finishing position $B_2$ shown in FIG. 2C. In this case, the command executor 14 determines the position X does not pass beyond the initialization finishing position $B_2$, and therefore, the above-described loop from step SB5 is repeated.

Figure 3:
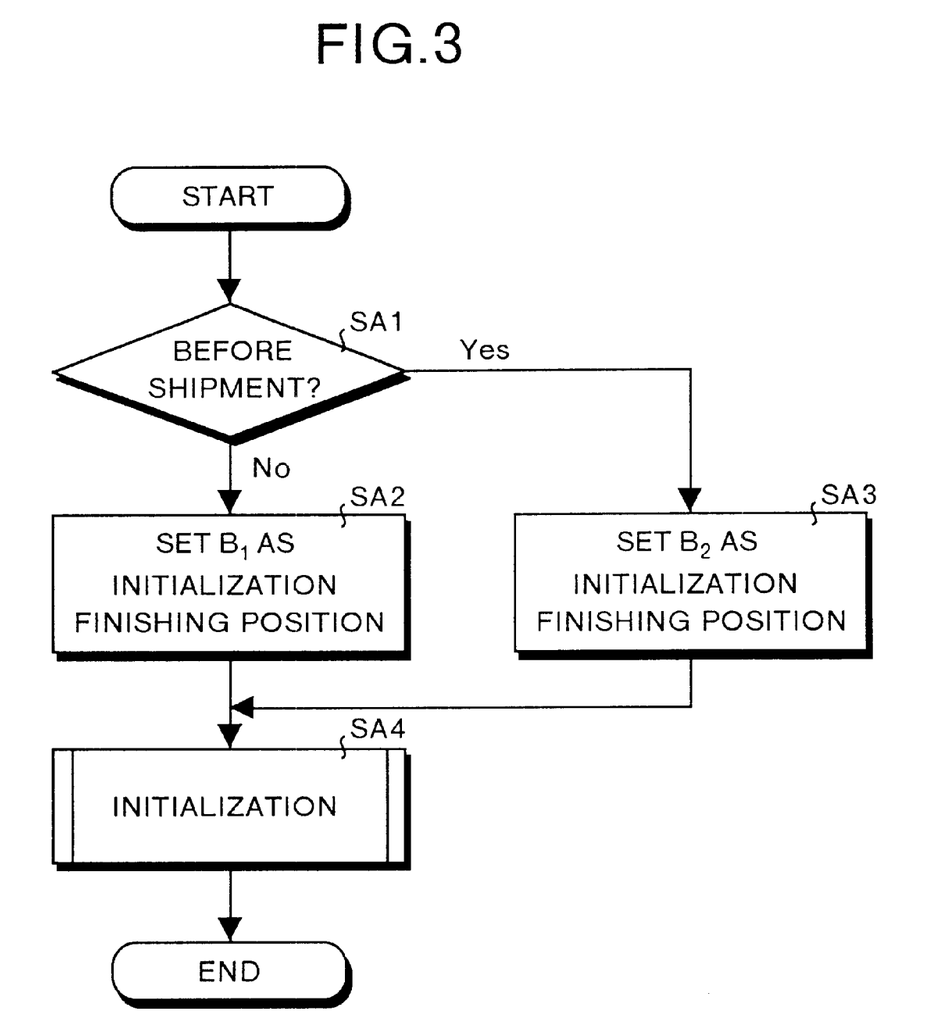
FIG. 3 is a flowchart showing Operational Example 1 of he embodiment according to the invention.

If the position X passes beyond the initialization finishing position $B_2$, the process then returns to the main routine shown in FIG. 3, and the initialization process is ended. In this way, both of the first and second recording regions $AR_1$ and $AR_2$ shown in FIG. 2C are initialized before the shipment of the recording medium 40.

An operation of initialization after the shipment by the user will now be explained. A user inputs an initialization command (hereinafter referred to as "an initialization command for a user") via the input device 31 illustrated in FIG. 1. Consequently, the computer 30 sends the initialization command for the user to the storage apparatus 10 via the SCSI cable. Thereafter, through the above-described operation, the command analyzer 13 analyzes the initialization command for the user, and sends the analysis result to the command executor 14.

At this moment, the access controller 15 determines whether or not the recording medium 40 is a product after shipment (Step SA1 of FIG. 3). Because the input command is the initialization command for the user, the access controller determines this recording medium 40 is a product that has been shipped once, and sets the initialization finishing position "$B_1$" shown in FIG. 2C in the command executor 14 (Step SA2).

Consequently, the command executor 14 executes the initialization (see FIG. 4) in the same manner as the above-described operation (Step SA4). In this case, however, the command executor 14 determines whether or not the position X passes beyond the initialization finishing position $B_1$ shown in FIG. 2C (Step SB8). When the position X passes beyond the initialization finishing position $B_1$, the command executor 14 considers the determination in step SB8 as "Yes", and thereafter, the process returns to the main process shown in FIG. 3, and a series of initialization is ended.

The first recording region $AR_1$ shown in FIG. 2C has already been initialized but the second recording region $AR_2$ is yet to be initialized. Therefore, the data stored in the first recording region $AR_1$ (the user data U and the first password $PW_1$) is erased but the data stored in the second recording region $AR_2$ (the control flag F and the second password $PW_2$) is not erased.

Operation Example 2

By way of the above-described Operation Example 1, there has been described that the region from the initialization starting position A to the initialization finishing position $B_1$ shown in FIG. 2C is initialized so that the data stored in the second recording region $AR_2$ can be protected when the initialization command for the user is input by the user. However, the data stored in the second recording region $AR_2$ can also be protected in accordance with Operational Example 2 explained below.

Operational Example 2 in the embodiment will be explained in detail below while referring to a flowchart illustrated in FIG. 6. When the user inputs the initialization command for the user via the input device 31 illustrated in FIG. 1, the computer 30 sends this initialization command for the user to the storage apparatus 10 via the SCSI cable. Thereafter, through the above-described operation, the command analyzer 13 analyses the command for the user, and then, sends the analysis result to the command executor 14.

At this time, the access controller 15 allows the command executor 14 to initialize both of the first recording region $AR_1$ and the second recording region $AR_2$ illustrated in FIG. 2C. Therefore, the command executor 14 reads the data stored in the second recording region $AR_2$ (the control flag F and the second password $PW_2$)(Step SD1). The command executor 14 then temporarily saves the read data in the buffer memory 16 (Step SD2).

The access controller 15 sets "$B_2$" shown in FIG. 2C in the command executor 14 as the initialization finishing position (Step SD3). Therefore, the command executor 14 executes the initialization (see FIG. 4) in the same manner as the above-described operation (Step SD4). In this case, however, the command executor 14 determines whether or not the position X passes beyond the initialization finishing position $B_2$ shown in FIG. 2C (Step SB8 of FIG. 4).

Figure 6:
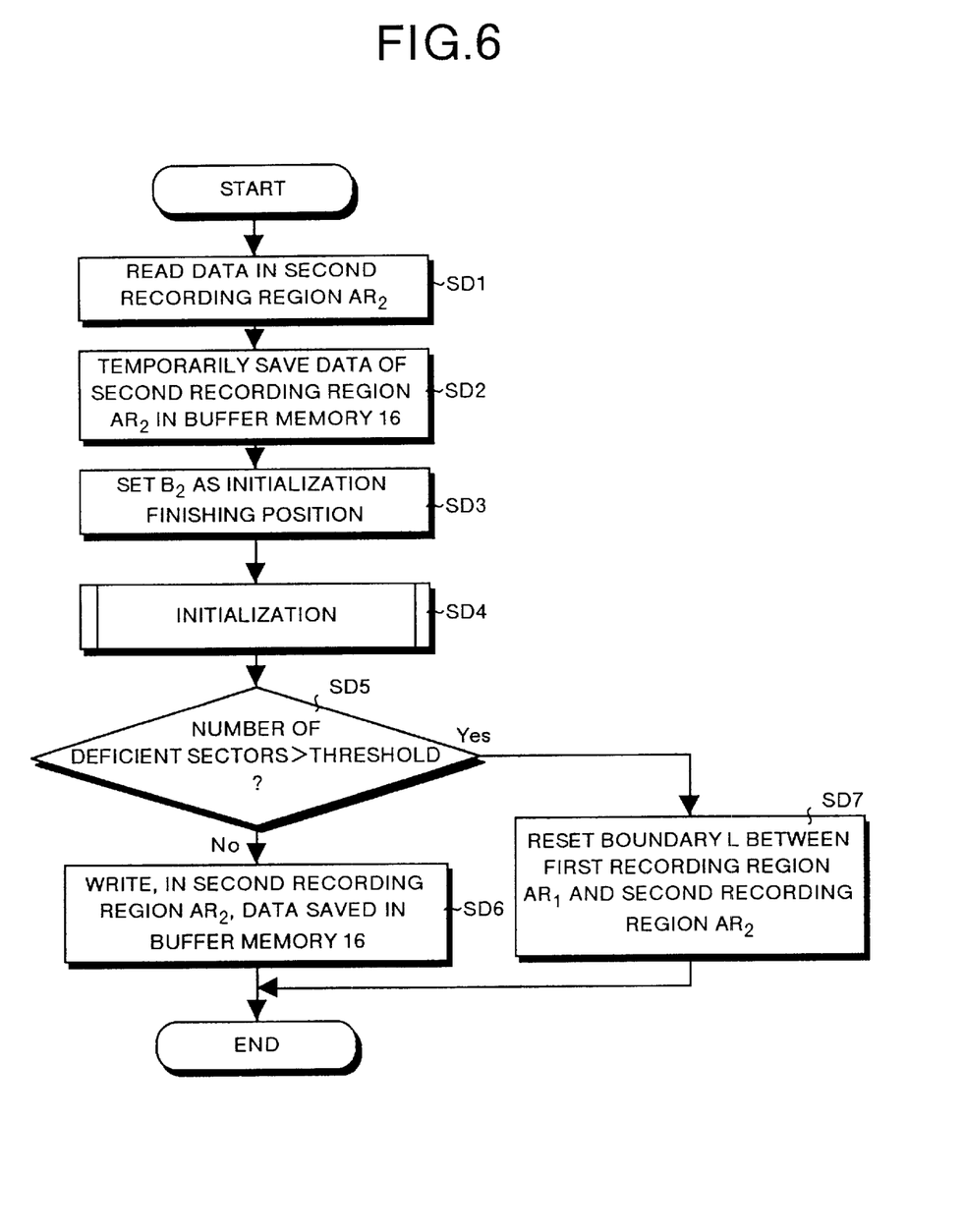
FIG. 6 is a flowchart showing Operational Example 2 of the embodiment according to the invention.

If the position X passes beyond the initialization finishing position $B_2$, the command executor 14 proceeds to step SD5 in FIG. 6. Since both the first recording region $AR_1$, the second recording region $AR_2$ shown in FIG. 2C are initialized the data in both the regions is deleted.

In step SD5, the command executor 14 determines whether or not the total number of deficient sectors relating to the first recording region $AR_1$, (or the second recording region $AR_2$) out of the deficient sectors registered in the deficient sector managing block (see Step SB10 of FIG. 4) in the initialization exceeds a threshold. If the result of determination is "No", then the command executor 14 in step DS6 writes the data (the control flag F and the second password $PW_2$) saved in the buffer memory 16 in the second recording region $AR_2$ of the recording medium 40, and the initialization process is ended. If the result of determination is "Yes", then the command executor 14 in step SD7 resets the boundary L shown in FIGS. 2A to 2C.

Specifically, the command executor 14 enlarges (or reduces) the first recording region $AR_1$ in accordance with the number of deficient sectors in the first recording region $AR_1$ (or the second recording region $AR_2$), while it resets the boundary L again in such a manner as to reduce (or enlarge) the second recording region $AR_2$ and thereafter, informs the access controller 15 of the resetting result. In association with the resetting of the boundary L, the initialization finishing position $B_1$ is shifted outward (or inward).

The command executor 14 in step SD6 writes the data (the control flag F and the second password $PW_2$) saved in the buffer memory 16 in the second recording region $AR_2$ of the recording medium 40, and a series of initialization is ended. At this time, although both of the first recording region $AR_1$ and the second recording region $AR_2$ illustrated in FIG. 2C are initialized, the data before the initialization (the control flag F and the second password $PW_2$) has been re-written in the second recording region $AR_2$.

Operation Example 3

An operational Example 3 in the embodiment will now be explained in detail in reference to a flowchart shown in FIG. 7. In Operational Example 3, the control flag F shown in FIGS. 2A to 2C is used as initialization control information such as initialization region designation, initialization prohibition or initialization allowance. When the user inputs the initialization command via the input device 31 shown in FIG. 1, the computer 30 sends this initialization command to the storage apparatus 10 via the SCSI cable. Thereafter, through the above-described operation, the command analyzer 13 analyses the command for the user, and then, sends the analysis result to the command executor 14.

Figure 7:
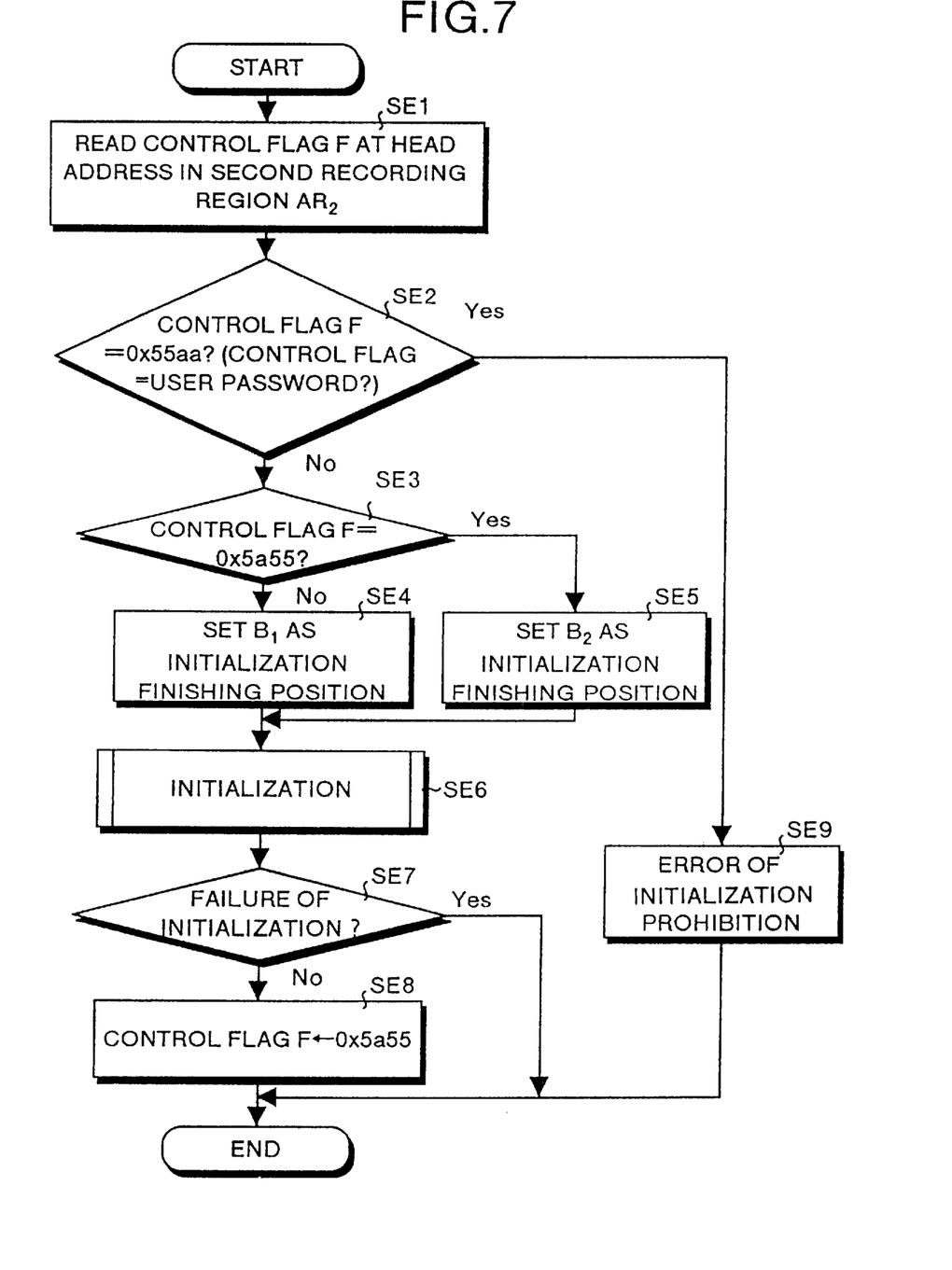
FIG. 7 is a flowchart showing Operational Example 3 of the embodiment according to the invention.

The command executor 14 then reads the control flag F (see FIG. 2C) stored at the head address in the second recording region $AR_2$ (Step SE1 of FIG. 7). Therefore, the access controller 15 determines whether or not the read control flag F is "0x55aa" (an initialization prohibiting flag) (Step SE2). If the read control flag F is "0x55aa", the access controller informs the command executor 14 of the determination result of the initialization as an initialization prohibiting error (Step SE9), and a series of initialization is ended. Thus, in this case, the command executor 14 never performs the initialization.

If the read control flag F is not "0x55aa", the access controller 15 determines whether or not the control flag F read in step SE1 is "0x5a55" (an initialization prohibiting flag in the second recording region $AR_2$) (Step SE3). If the read control flag F is "0x5a55", the access controller 15 sets, in the command executor 14, the initialization finishing position "$B_1$", illustrated in FIG. 2C (Step SE5).

The command executor 14 then executes the initialization (see FIG. 4) in the same manner as the above-described operation. In this case, however, the command executor 14 determines whether or not the position X passes beyond the initialization finishing position $B_1$ illustrated in FIG. 2C (Step SB8). If the position X passes beyond the initialization finishing position $B_1$, the process proceeds to step SE7 shown in FIG. 7. At this moment, only the first recording region $AR_1$ shown in FIG. 2C has been initialized.

On the contrary, if the read control flag is not "0x5a55", i.e., no value is set in the control flag F, the access controller 15 sets the initialization finishing position "$B_2$" illustrated in FIG. 2C in the command executor 14 (Step SE4). In this way, the command executor 14 executes the initialization (see FIG. 4) in the same manner as the above-described operation (Step SE6).

In this case, however, the command executor 14 determines whether or not the position X passes beyond the initialization finishing position $B_2$ shown in FIG. 2C in step SB8 shown in FIG. 4. Then if the position X passes beyond the initialization finishing position $B_2$, the control proceeds to step SE7 shown in FIG. 7. At this moment, both of the first recording region $AR_1$ and the second recording region $AR_2$ shown in FIG. 2C have been initialized.

The command executor 14 then determines whether the initialization ends in failure or not (Step SE7). In particular, the command executor 14 determines that the initialization shown in FIG. 4 ends in failure when the deficient sector-managing block is not sufficient (See Step SB9 of FIG. 4). If the initialization ends in failure, the command executor 14 ends a series of initialization. On the contrary, if the initialization does not end in failure, i.e., ends correctly, the command executor 14 overwrites "0x5a55" (the initialization prohibiting flag in the second recording region $AR_2$) in the control flag F at the head address in the second recording region $AR_2$ (Step SE8), and a series of initialization is ended.

In this operation Example 3, the process may be changed in such a manner that if the control flag F accords with the user password to be input by the user in step SE2 shown in FIG. 7 then the control proceed to step SE3, and if the control flag F does not accord with the user password then the control proceeds to step SE9. In other words, in this case, only a person who knows the user password can perform the initialization control. Here, since the control flag F recorded in the second recording region $AR_2$ cannot be erased even if the recording medium 40 is initialized, the user password never be changed. Therefore, even after the initialization, the initialization control can be performed by the use of the same user password.

Use Example 1

Figure 8:
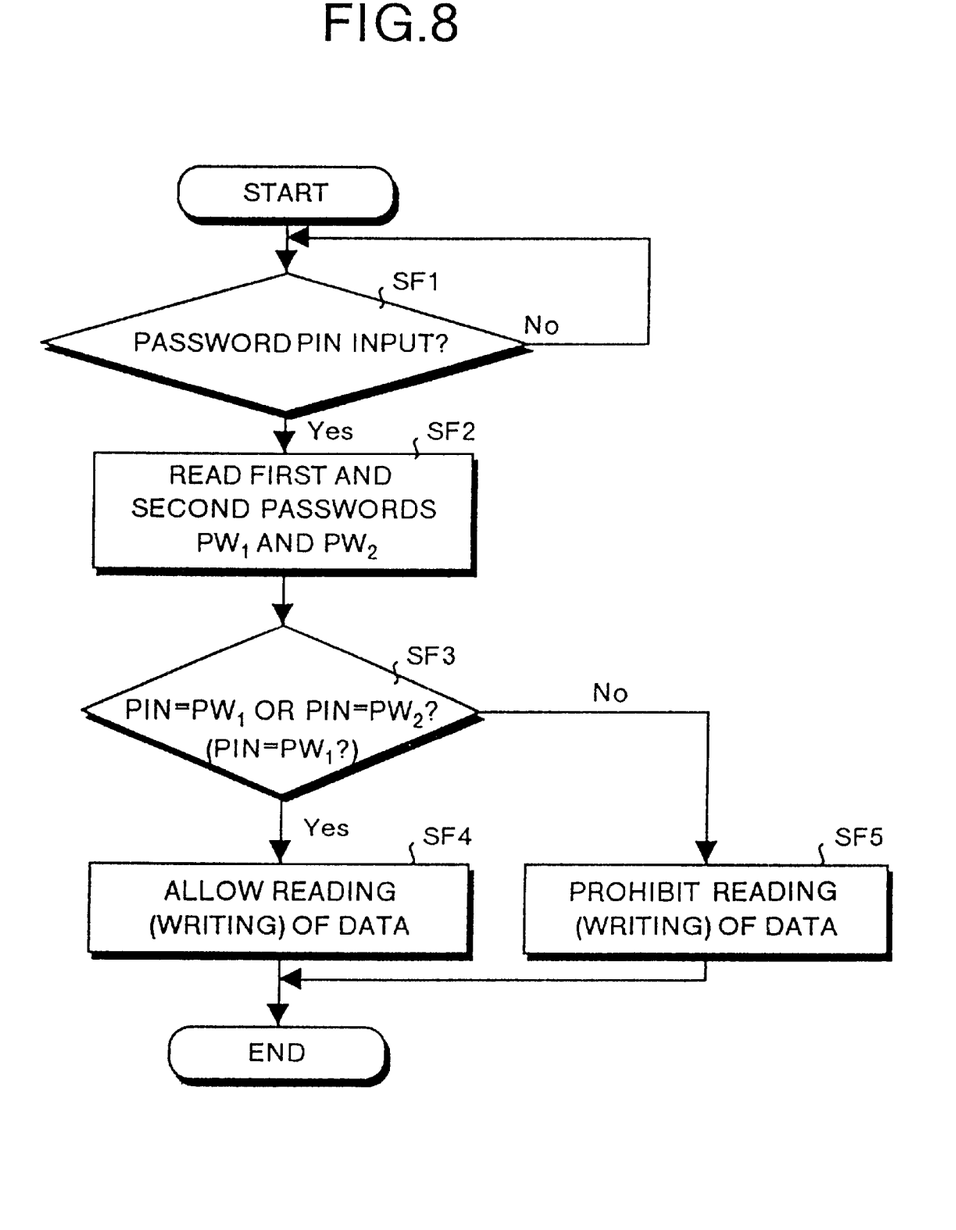
FIG. 8 is a flowchart showing access control in the embodiment according to the invention.

In the above-described Operation Examples 1 to 3, the explanation has been given to the example in which the initialization of the second recording region $AR_2$ out of the first recording region $AR_1$ and the second recording region $AR_2$ shown in FIG. 2C is prohibited in executing the initialization of the recording medium 40. An operation in the case of the access control of the recording medium 40 will be explained with reference to a flowchart sown in FIG. 8, as a Use Example 1 on the user side in the case where the initialization of the second recording region $AR_2$ is prohibited.

The access control here is the control for restricting the reading of the data from the recording medium 40 to only the authorized user so as to prohibit the data reading by a third party by using the first password $PW_1$ and the second password $PW_2$ (or the first password $PW_1$) shown in FIGS. 2A to 2C for the purpose of security enhancement.

An example in which a group composed of a group leader (a manager) and a plurality of members (workers) uses the first password $PW_1$ and the second password $PW_2$ will be explained. Here, the group leader manages the second password $PW_2$. The second password $PW_2$ is written in the second recording region $AR_2$ shown in FIG. 2C. That is, the second password $PW_2$ is written in the region which can not be initialized.

On the other hand, the plurality of members manage the first password $PW_1$. The first password $PW_1$ is written in the first recording region $AR_1$ shown in FIG. 2C. That is, the first password $PW_1$ is written in the region which is allowed to be initialized. Here, the members can appropriately change the first password $PW_1$, and further, they are allowed to initialize the recording medium 40 without the permission of the group leader. With either of the first password $PW_1$ and the second password $PW_2$ the permission of reading can be obtained. With the first password $PW_1$ a passwords permission of writing in addition to the permission of reading can be obtained.

On the above-described presumption, the access controller 15 shown in FIG. 1 determines whether or not a password PIN from the computer 30 is input into the command executor 14 following a read command for reading the data (Step SF1). If the password PIN is not input, the same determination is repeated. Here, the password PIN is a password input by the user (such as the group leader, the members or a third party). For example, if the group leader inputs the second password $PW_2$ as the password PIN, the access controller 15 determines that the password PIN is input.

The access controller 15 then instructs the command executor 14 to read the first and second passwords $PW_1$ and $PW_2$ from the first and second recording regions $AR_1$ and $AR_2$ shown in FIG. 2C (Step SF2). In this way, the first and second passwords $PW_1$ and $PW_2$ are read from the first and second recording regions $AR_1$ and $AR_2$, respectively.

The access controller 15 then determines whether or not the password PIN accords with the first password $PW_1$ (or the second password $PW_2$) read in step SF2 (Step SF3). In this case, since the password PIN (=the second password $PW_2$) is identical to the second password $PW_2$, the access controller 15 allows the command executor 14 to read the data from the recording medium 40 (Step SF4), and a series of processing is ended. Thus, the command executor 14 reads the data from the recording medium 40.

If the password PIN accords with the first password $PW_1$ in the same manner as the above-described case of the group leader in the case where the member inputs the password PIN (=the first password $PW_1$), the data is read from the recording medium 40. Here, in the case where a third party inputs the password PIN ($\neq$ the first password $PW_1$, $\neq$ the second password $PW_2$), the password PIN does not accord with the first password $PW_1$ (or the second password $PW_2$) read in step SF2 (Step SF3). Therefore, the access controller 15 prohibits the command executor 14 from reading the data out of the recording medium 40 (Step SF5), and a series of processing is ended. Consequently, no data can be read out of the recording medium 40, thus ensuring the security against unauthorized reading by a third party.

Furthermore, in this Use Example 1, if the work is to be consigned to a subcontractor (a third party), the group leader hands-over the recording medium 40 in which the second password $PW_2$ is set in the second recording region $AR_2$ to the subcontractor, thereby securing the confidentiality of the data written in the recording medium 40. Here, the subcontractor can set and change the first password $PW_1$ only for writing the data in the recording medium 40. Therefore, an ordering person need not tell the first password $PW_1$ to the subcontractor.

When the subcontractor receives the recording medium 40 in which the user password $PW_2$ is set, he/she starts predetermined work. In this case, the subcontractor sets the first password $PW_1$ only for writing in the recording medium 40, and writes the working result in the recording medium 40 while protecting unauthorized writing by a third party via the first password $PW_1$. That is, when the subcontractor inputs the first password $PW_1$ as the password PIN, the access controller 15 determines the password is input (Step SF1).

Therefore, the access controller 15 instructs the command executor 14 to read the first password $PW_1$ and the second password $PW_2$ from the first recording region $AR_1$ and the second recording region $AR_2$ shown in FIG. 2C (Step SF2). In this way, the first password $PW_1$ and the second password $PW_2$ are read out of the first recording region $AR_1$ and the second recording region $AR_2$, respectively.

In this case, the access controller 15 determines whether or not the condition inside the parenthesis is established, namely, whether or not the password PIN (in this case, the first password $PW_1$) accords with the first password $PW_1$ read in step SF2 (Step SF3). Since the password PIN (=the first password $PW_1$) is identical to the first password $PW_1$ here, the access controller 15 allows the command executor 14 to write data in the recording medium 40 (parenthesized in FIG. 8) (Step SF4), and a series of processing is ended. The subordinator writes the working result (the data) in the recording medium 40 via the command executor 14.

If a third party inputs the password PIN (which is not the first password $PW_1$) the password PIN will not accord with the first password $PW_1$ (or the second password $PW_2$) read in step SF2 (Step SF3). Therefore, the access controller 15 prohibits the command executor 14 from writing data in the recording medium 40 (Step SF5), and a series of processing is ended. Consequently, it is possible to prevent unauthorized writing of data in the recording medium 40 by a third party. Since the subordinator does not know the second password $PW_2$, he/she cannot read the data out of the recording medium 40. The subordinator delivers the recording medium 40 in which the working result is written, to an ordering person. Thus, like the above-described operation, the ordering person reads the working result out of the recording medium 40 by the use of the user password $PW_2$.

The ordering person can read the first password $PW_1$, which is used by the subordinator, from the recording medium 40. In this way, in the Use Example 1, the recording medium 40, in which the read-only user password $PW_2$ is recorded, is taken over to the subordinator, and further, the first password $PW_1$ is used as the write-only password with respect to the recording medium 40. Consequently, the ordering person can request the subordinator to work with high security. This is because no password is sent/received between the ordering person and the subordinator so as not to be leaked to a third party present on the way of a communication path between the ordering person and the subordinator. Further, in the Use Example 1, even when the member forgets the first password $PW_1$, he/she can read the data from the recording medium 40 by the use of the second password $PW_2$ of the group leader.

Use Example 2

In the above Use Example 1 the explanation has been given to the access control of the recording medium 40 in the case where the initialization of the second recording region $AR_2$ is prohibited. The access control of the recording medium 40 can be performed by way of a Use Example 2 (see FIG. 9) which will be explained below. The access control here is the control for allowing only an authorized user to write (or read) the data in (or from) the recording medium 40 and preventing a third party from writing data for the purpose of enhancement of the security by using the first and second passwords $PW_1$ and $PW_2$ shown in FIGS. 2A to 2C.

Hereinafter, like the Use Example 1, an example in which a group composed of a group leader and a plurality of members (workers) uses the first and second passwords $PW_1$ and $PW_2$ will be explained. The first and second passwords $PW_1$ and $PW_2$ are passwords which can obtain the permission of writing by assuming the input of both to be a condition. Therefore, when the first and second passwords $PW_1$ and $PW_2$ are independently used, the permission of writing cannot be obtained.

Figure 9:
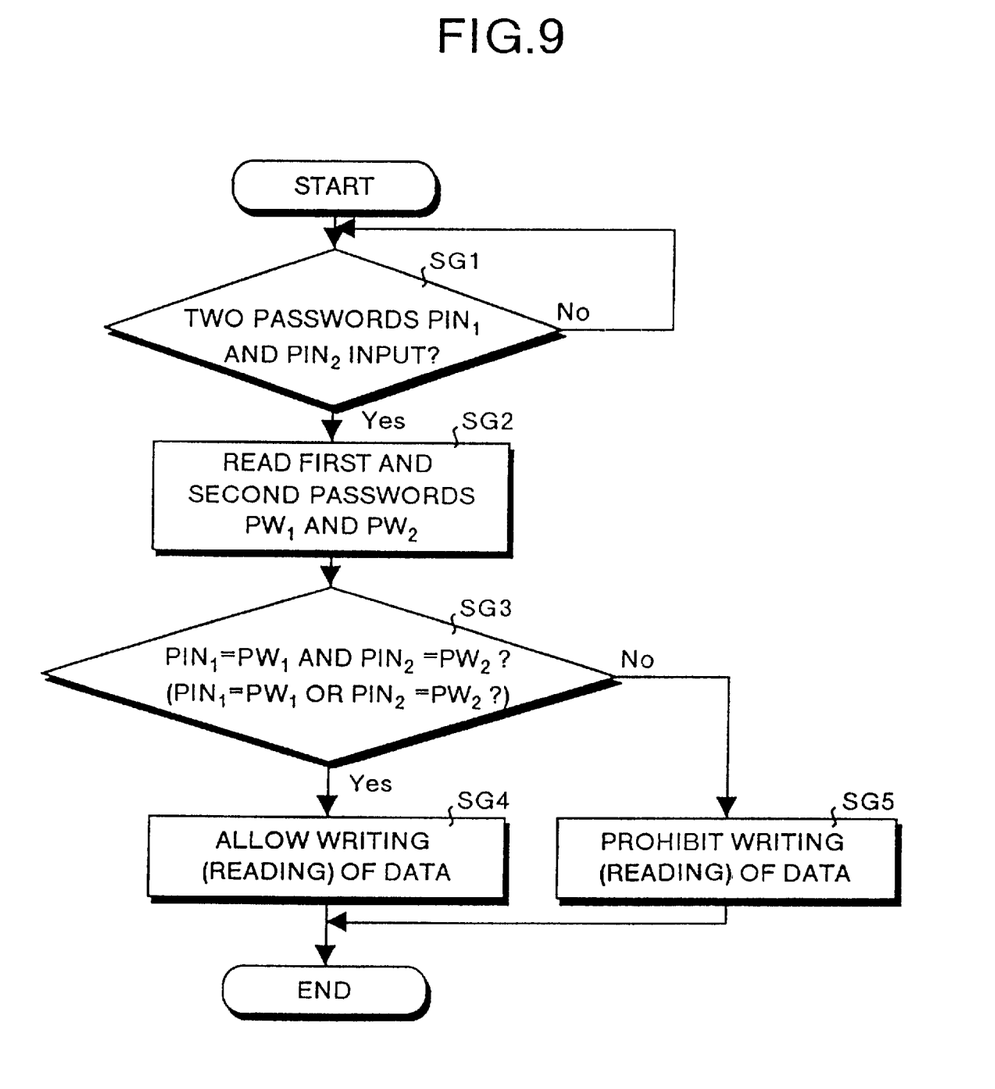
FIG. 9 is a flowchart showing the access control in the embodiment according to the invention.

On the above-described presumption, the access controller 15 shown in FIG. 1 determines whether or not two passwords $PIN_1$ and $PIN_2$ are input into the command executor 14 from the computer 30 following a write command for writing data (Step SG1 of FIG. 9). If the two passwords $PIN_1$ and $PIN_2$ are not input, the same determination is repeated. For example, when the member inputs the first password $PW_1$ as a password $PIN_1$, while the group leader inputs the second password $PW_2$ as a password $PIN_2$, respectively, the access controller 15 determines that the two passwords $PIN_1$ and $PIN_2$ are input.

Therefore, the access controller 15 instructs the command executor 14 to read the first and second passwords $PW_1$ and $PW_2$ from the first and second recording regions $AR_1$ and $AR_2$ respectively (Step SG2).

The access controller 15 then determines whether or not the password $PIN_1$ (in this case, the first password $PW_1$) input by the member accords with the first password $PW_1$ read in step SG2 and the password $PIN_2$ (in this case, the second password $PW_2$) input by the group leader accords with the second password $PW_2$ read in step SG2 at the same time (Step SG3).

In this case, the access controller 15 determines that the input passwords $PIN_1$ and $PIN_2$ accord with the first and second passwords $PW_1$ and $PW_2$ read in step SG2. Therefore, the access controller 15 allows the command executor 14 to write data in the recording medium 40 (Step SG4), and a series of processing is ended. Thus, the command executor 14 writes the data in the recording medium 40.

When a third party inputs both of the password $PIN_1$ ($\neq$ the first password $PW_1$) and the password $PIN_2$ ($\neq$ the second password $PW_2$) the access controller 15 determines that the input passwords $PIN_1$ and $PIN_2$ do not accord with the first and second passwords $PW_1$ and $PW_2$ read in step SG2. Therefore, the access controller 15 prohibits the command executor 14 from writing the data in the recording medium 40 (Step SG5), and a series of processing is ended. Consequently, no data is written in the recording medium 40, thus ensuring the security with respect to unauthorized writing by a third party.

In the Use Example 2, further, the data can be read out of the recording medium 40 in the case where the password $PIN_1$ accords with the first password $PW_1$ or the password $PIN_2$ accords with the second password $PW_2$ (Step SG3 of FIG. 9). In this case, if the password $PIN_1$ accords with the first password $PW_1$ or the password $PIN_2$ accords with the second password $PW_2$, the data is allowed to be read out of the recording medium 40 (Step SG4). In the meantime, if the password $PIN_1$ does not accord with the first password $PW_1$ as well as the password $PIN_2$ does not accord with the second password $PW_2$, the data is prohibited from being read out of the recording medium 40 (Step SG5). In this manner, the access control is performed on the recording medium 40.

Furthermore, in the Use Example 2, the data can be allowed to be read out of the recording medium 40 only in the case where the password $PIN_1$ accords with the first password $PW_1$ and the password $PIN_2$ accords with the second password $PW_2$ (Step SG3 of FIG. 9). When the determination condition in step SG3 is established in this manner, the user password $PW_2$ may be used as follows: namely, the above group leader (manager) manages the above user password $PW_2$ and executes software installed via his/her own computer terminal so as to automatically send the above user password $PW_2$ to the storage apparatus which is accessed from a computer terminal or a network server in the working environment of the members (workers).

In this case, the user password $PW_2$ is concealed from the member. The member writes data in the recording medium 40 by using the first password $PW_1$. Here, since the user password $PW_2$ is not known even when the recording medium 40 is taken out in an unauthorized manner, the above-described condition (i.e., the password $PIN_1$ accords with the first password $PW_1$ and the password $PIN_2$ accords with the second password $PW_2$) is not satisfied, so that the data cannot be read out of the recording medium 40. Furthermore, since the user password $PW_2$ is protected, as described above, even when the recording medium 40 is initialized in the regular working environment. Therefore, the access control can also be performed on the recording medium 40.

As described above in the Use Example 1 in the embodiment, the first and second passwords $PW_1$ and $PW_2$ are set in the first and second recording regions $AR_1$ and $AR_2$ of the recording medium 40, respectively, and further, the second recording region $AR_2$ cannot be initialized at the time of initialization.

Consequently, it is possible to perform the access control thereafter and maintain the security on the basis of the second password $PW_2$. In the embodiment, since the control flag F is set in the second recording region $AR_2$ which cannot be initialized, it is unnecessary to reset the control flag F at the next initialization.

As explained above in the Use Example 2 of the embodiment, the access control is performed on the basis of both of the first and second passwords $PW_1$ and $PW_2$, it is possible to enhance the security. Further, it is possible to prevent any unauthorized access from an third party on the basis of the remaining second password $PW_2$ even after the initialization.

Although the embodiment according to the present invention has been explained in details in reference to the drawings, it is to be understood that specific constitutional examples are not limited to the above-described embodiment, and that various modifications in design can be added thereto without departing from the scope of the invention. For example, although the description has been given of the embodiment in which the recording medium 40 is a magneto-optical disk, any kind of recording medium can be used. Therefore, the present invention is applicable to a magnetic disk device incorporating a recording medium therein as well as other recording mediums such as a floppy disk, a magnetic disk, an optical disk and a phase-change type optical disk.

Additionally, although the access control is performed by using the first and second passwords PW, and $PW_1$ as explained in the Use Examples 1 and 2 of the embodiment, two control flags F may be used in place of the first and second passwords $PW_1$ and $PW_2$. In this case, one control flag F may be provided with the same function as that of the first password $PW_1$ while the other control flag F may be provided with the same function as that of the second password $PW_2$.

According to the present invention, the first control information and the second control information are set in the first recording region and the second recording region respectively, and the second recording region cannot be initialized at the time of initialization. Therefore, there is the advantage that the effective access control can be performed thereafter on the basis of the second control information, and further, the security can be maintained.

Further, the initialization control information is set in the second recording region which cannot be initialized. Therefore, there is the advantage that it is unnecessary to reset the initialization control information at the time of next initialization.

Further, the access control is performed on the basis of any one of the first control information and the second control information. Therefore, it is possible to perform the effective access control on the basis of the remaining second control information, and also maintain the security even when the first control information is erased due to initialization.

Further, the access control is performed on the basis of both of the first control information and the second control information. Therefore, it is possible to enhance the security, and prevent any unauthorized access by a third party on the basis of the remaining second control information even if initialization has been performed.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A storage apparatus comprising:

a recording medium having a first recording region and a second recording region;

a setting unit which sets first control information and second control information, which control information is the information for performing access control so as to restrict unauthorized access to said recording medium, in the first recording region and the second recording region respectively;

an access control unit which performs the access control on the basis of the first control information and the second control information; and an initializing unit which initializes only the first recording region in initializing said recording medium, wherein initialization control information for designating the region to be initialized is set in the second recording region; and said initializing unit initializes the first recording region on the basis of the initialization control information.

2. The storage apparatus according to claim 1, wherein said access control unit performs the access control on the basis of any one of the first control information and the second control information.

3. The storage apparatus according to claim 1, wherein said access control unit performs the access control on the basis of both of the first control information and the second control information.

4. An access control apparatus for a recording medium having a first recording region and a second recording region, said access control apparatus comprising:

a setting unit which sets first control information and second control information, which control information is the information for performing access control so as to restrict unauthorized access to said recording medium, in the first recording region and the second recording region respectively;

an access control unit which performs the access control on the basis of the first control information and the second control information; and an initializing unit which initializes only the first recording region in initializing said recording medium, wherein initialization control information for designating the region to be initialized is set in the second recording region; and said initializing unit initializes the first recording region on the basis of the initialization control information.

5. An access control method for a recording medium having a first recording region and a second recording region, said access control method comprising the steps of:

setting first control information and second control information, which control information is the information for performing access control so as to restrict unauthorized access to said recording medium, in the first recording region and the second recording region respectively;

performing the access control on the basis of the first control information and the second control information; and initializing only the first recording region in initializing said recording medium, wherein initialization control information for designating the region to be initialized is set in the second recording region; and the first recording region is initialized in the initializing step on the basis of the initialization control information.

6. The access control method according to claim 5, wherein the access control is performed at the access control step on the basis of any one of the first control information and the second control information.

7. The access control method according to claim 5, wherein the access control is performed at the access control on the basis of both of the first control information and the second control information.

* * * * *